United States Patent [19]

Chen et al.

[11] Patent Number: 4,851,993
[45] Date of Patent: Jul. 25, 1989

[54] CACHE MOVE-IN BYPASS

[75] Inventors: Jack Chen, Sunnyvale; Jeffrey A. Thomas, Cupertino; Joseph A. Petolino, Jr.; Michael J. Begley, both of Palo Alto; Ajay Shah; Michael D. Taylor, both of San Jose; Richard J. Tobias, Palo Alto, all of Calif.

[73] Assignee: Amdahl Corporation, Sunnyvale, Calif.

[21] Appl. No.: 41,046

[22] Filed: Apr. 20, 1987

[51] Int. Cl.⁴ .................. G06F 13/00; G06F 11/00
[52] U.S. Cl. .................................................. 364/200
[58] Field of Search ... 364/200 MS File, 900 MS File; 371/13, 51, 38

[56] References Cited

U.S. PATENT DOCUMENTS

| | | | |
|---|---|---|---|
| 4,112,502 | 9/1978 | Scheuneman | 364/900 |
| 4,317,168 | 2/1982 | Messina et al. | 364/200 |
| 4,433,374 | 2/1984 | Hanson et al. | 364/200 |
| 4,500,954 | 2/1985 | Duke et al. | 364/200 |
| 4,586,133 | 4/1986 | Steckler | 364/200 |
| 4,594,658 | 6/1986 | Steckler | 364/200 |
| 4,604,750 | 8/1986 | Manton et al. | 371/13 |
| 4,625,273 | 11/1986 | Woffinden et al. | 364/200 |
| 4,646,233 | 2/1987 | Weatherford et al. | 364/200 |
| 4,682,281 | 7/1987 | Woffinden et al. | 364/200 |
| 4,685,082 | 8/1987 | Cheung et al. | 364/200 X |
| 4,686,621 | 8/1987 | Keeley et al. | 364/200 |
| 4,719,568 | 1/1988 | Carrubba et al. | 364/200 |

Primary Examiner—Gareth D. Shaw
Assistant Examiner—Paul Kulik
Attorney, Agent, or Firm—Fliesler, Dubb, Meyer & Lovejoy

[57] ABSTRACT

Bypassing of data from a main storage unit to an instruction and operand processing unit around an intermediate storage unit improves performance in a data processing system. The instruction and operand processing unit supplies requests for operands to the intermediate storage unit or cache. If the line is missing from the cache, the request operand is retrieved from the main storage unit. A bypass data path is connected between the main storage unit, prior to error detecting means in the cache, and the instruction and operand processing unit for transferring requested operands to the instruction and operand processing unit directly. Control, coupled to receive requests for operands and to the instruction and operand processing unit, signals the instruction and operand processing unit to receive the requested operands from the bypass data path when the data includes a requested operand.

9 Claims, 4 Drawing Sheets

CACHE MOVE-IN BYPASS

CROSS-REFERENCES TO RELATED APPLICATIONS

The present application is related to U.S. patent applications:

(1) Ser. No. 920,803, filed Oct. 17, 1986 entitled CACHE STORAGE PRIORITY, now U.S. Pat. No. 4,722,046, (2) Ser. No. 908,623, filed Sept. 18, 1986 entitled EXECUTION SUB-UNIT SYNCHRONIZATION, (3) Ser. No. 900,640, filed Aug. 27, 1986 entitled CACHE STORAGE QUEUE, which was abandoned in favor of U.S. Ser. No. 233,953, (4) Ser. No. 527,673, filed Aug. 30, 1983 entitled APPARATUS FOR BUFFER CONTROL BYPASS, now U.S. Pat. No. 4,742,454.

These applications are currently owned, and were owned at the time of invention, by the same assignee as the present application. Further, each of these applications is incorporated by reference as is fully set forth in this application.

1. Field of the invention

The present invention relates to the transfer of data to an instruction and operand processing unit in a data processing system from a high speed cache and a main storage unit; and particularly to bypassing data from the main storage unit to the instruction and operand processing unit.

2. Background of the Invention

Computers based on the classic IBM 360/370 architecture typically include an instruction and operand processing unit, an intermediate high speed storage unit (cache) and a main storage unit. The main storage unit stores the entire data set and includes means for transferring data to the cache. The cache stores a subset of the entire data set. The instruction and operand processing unit generates requests for operands and communicates those requests to the cache. The cache returns operands identified by the request to the instruction and operand processing unit. Often requests for operands from the instruction and operand processing unit cannot be fulfilled in a first try by cache access. In this case, the data is moved into the cache from the main storage unit, replacing other data in the cache. When the data has been moved in to the cache, the request can be fulfilled by supplying the requested operand to the instruction and operand processing unit.

The cache stores lines of data at data locations identified by cache addresses. The cache addresses are included in a request generated by the instruction and operand processing unit. If the line of data that satisfies the request is not at the data location identified by the address of the request, a "line missing" state is reached. In the line missing state the request is translated to supply a main store address that identifies the location of the missing line in the main store. The main store address is supplied to the main store and the data is in turn supplied back to the cache in a process known as a move-in.

The cache includes a move-in register that receives lines of data from the main store pending transfer into the data locations that make up the addressable storage space in the cache. In most machines, error checking and correcting logic is placed between the main storage unit and the move-in register so that any errors that may occur in a line of data being moved in can be corrected prior to supply to the cache.

The move-in process for retrieving a requested operand is a comparatively time-consuming operation in a computer. In high speed pipeline machines, the instruction and operand processing unit pipeline may interlock while awaiting the supply of a requested operand. If the operand resides in a line missing from the cache, the lengthy move-in process will result in an undesirably long interlock of the instruction and processing unit pipeline. Thus it is desirable to reduce the time required, called the cache miss penalty, for supplying a requested operand to the instruction and operand processing complex from a line missing state.

One example of a prior art solution to the problem of reducing a wait for a requested operand in a line missing state is described in U.S. Pat. No. 4,742,454, entitled APPARATUS FOR BUFFER CONTROL BYPASS. In the APPARATUS FOR BUFFER CONTROL BYPASS application, the control of the buffer is modified in the line missing state so that a quicker transfer of a requested operand can occur. This buffer control bypass occurs because data in the cache is stored in units known as lines, while operands requested by the instruction and operand processing unit are typically less than an entire line of data. Further, when a line of data is being moved into the cache, it comes in a plurality of segments, such as quarterlines. It was found in the buffer control bypass system, that a line being moved in can be aligned to provide the requested operand from the move-in register to the cache first. Buffer control can then be bypassed to allow a read of the requested operand from the data location in the cache before the balance of the line is written to the cache. This was found to result in a significant improvement in system performance by reducing the waits caused by a line missing state.

Another example of a prior art approach to reducing the overhead in time of a line missing state has been to provide a data path directly from the output of error checking and correcting logic through a bypass data register for holding the requested operand latched in parallel with the move-in register. In addition, a complicated bypass match logic was required to indicate when the data in the bypass data register was the requested operand. By moving the bypass path back effectively to the move-in register prior to the cache, a significant savings was accomplished over the control bypass scheme; however, a significant penalty in logic complexity was paid.

Although the prior art schemes have proved beneficial in reducing the cache miss penalty for satisfying requests for operands, it is desirable to further reduce the overhead and logic complexity of such bypass schemes.

SUMMARY OF THE INVENTION

The present invention provides for bypass of requested operands directly from the main store and simplifies the logic required for detecting requested operands suitable for bypass. It is found that the invention provides a substantial overall performance improvement in the computer by reducing the cache miss penalty.

Accordingly, in one aspect, the present invention is an apparatus for transferring data among an instruction and operand processing unit, an intermediate storage unit and a main storage unit in a data processing system.

The instruction and operand processing unit supplies requests for operands to the intermediate storage unit. The intermediate storage unit supplies requested operands to the instruction and operand processing unit if the requested operand resides in a line present in the intermediate storage unit. If the line is missing, then the line containing the requested operand is retrieved from the main storage unit.

The apparatus comprises supply means for supplying the data from the main storage unit to the intermediate storage unit. In addition, an error detecting means is included coupled to the supply means for detecting errors in the data being supplied from the main storage unit. A move-in register is coupled to the error detecting means for storing the retrieved data pending storage in the intermediate storage unit. Storage means in the intermediate storage unit is coupled to the move-in register for storing data retrieved from the main storage unit for supply to the instruction and operand processing unit in response to requests. A primary data path is coupled to the storage means in the intermediate storage unit and the instruction and operand processing unit for transferring requested operands to the instruction and operand processing unit. A bypass data path is connected between the supply means prior to the error detecting means and the instruction and operand processing unit for transferring requested operands to the instruction and operand processing unit directly from the supply means. Finally, control means are coupled to receive requests for operands and to the instruction and operand processing unit to signal the instruction and operand processing unit to receive the requested operands from the bypass data path when the data in the supply means includes a requested operand.

DETAILED DESCRIPTION

Figure 2:
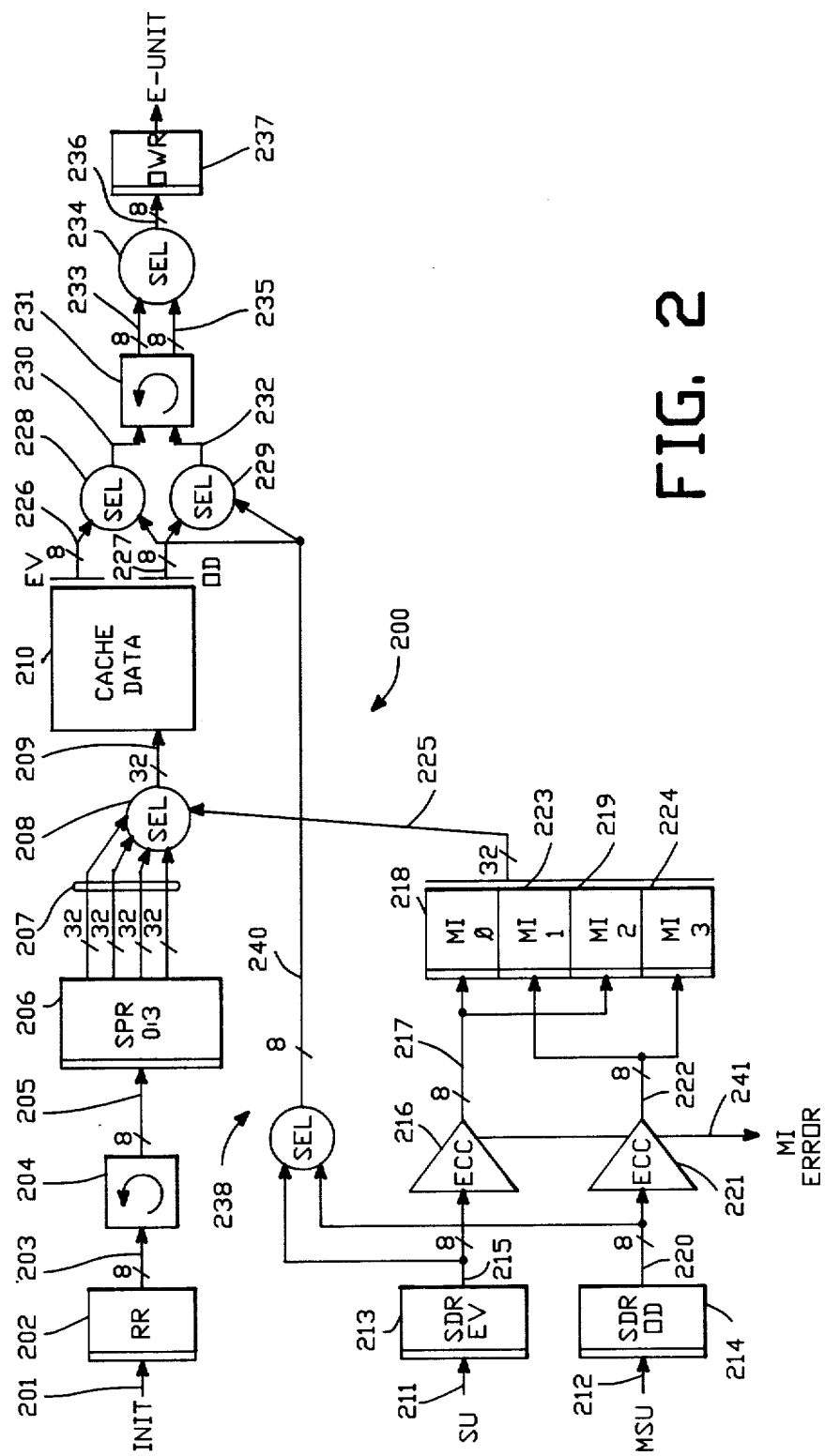
FIG. 2 is a diagram of the data paths of the data processing system of FIG. 1 pertinent to the present invention.
Figure 3:
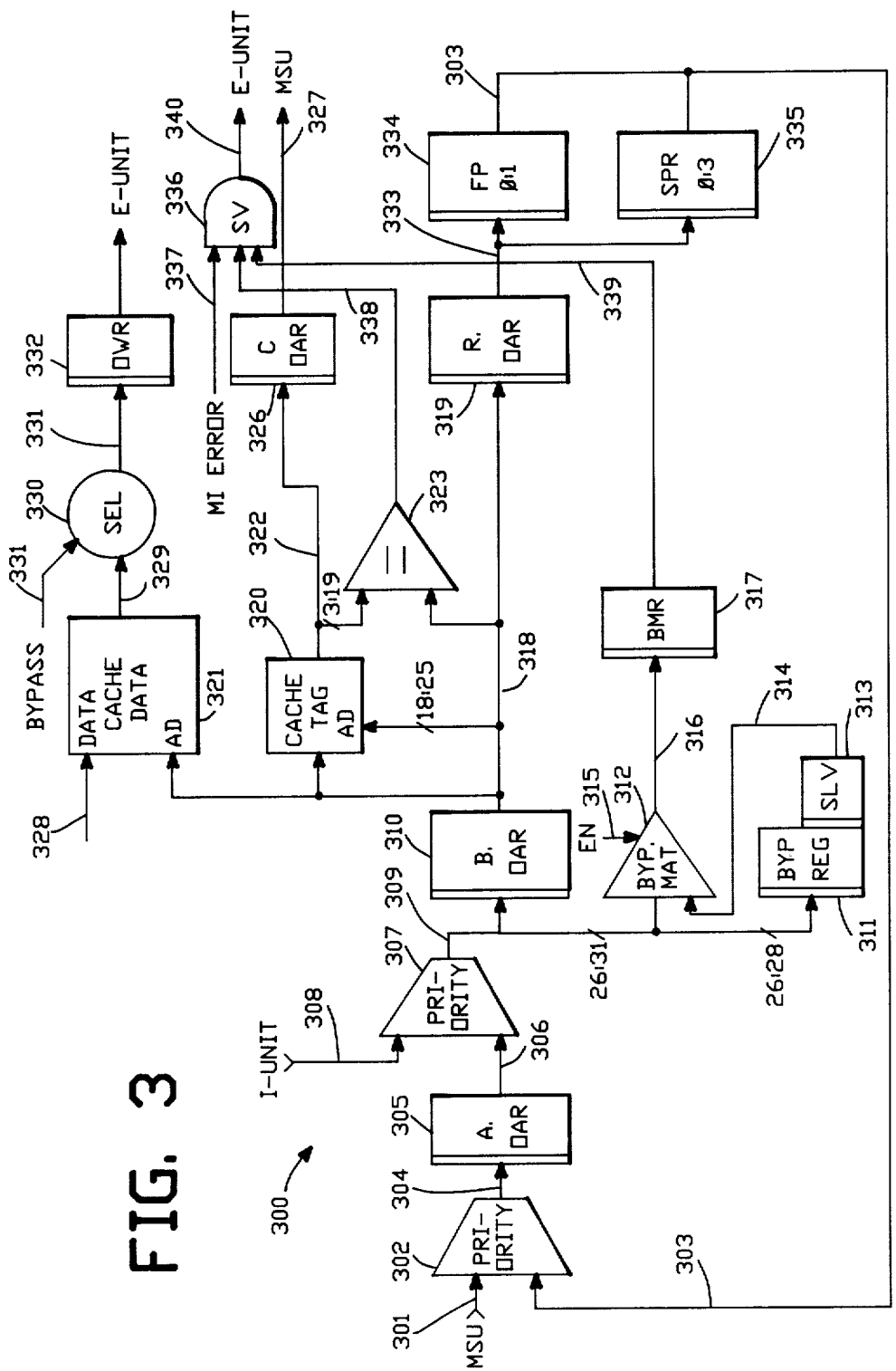
FIG. 3 is a diagram of the address and control paths in the intermediate storage unit pertinent to the present invention.
Figure 4:
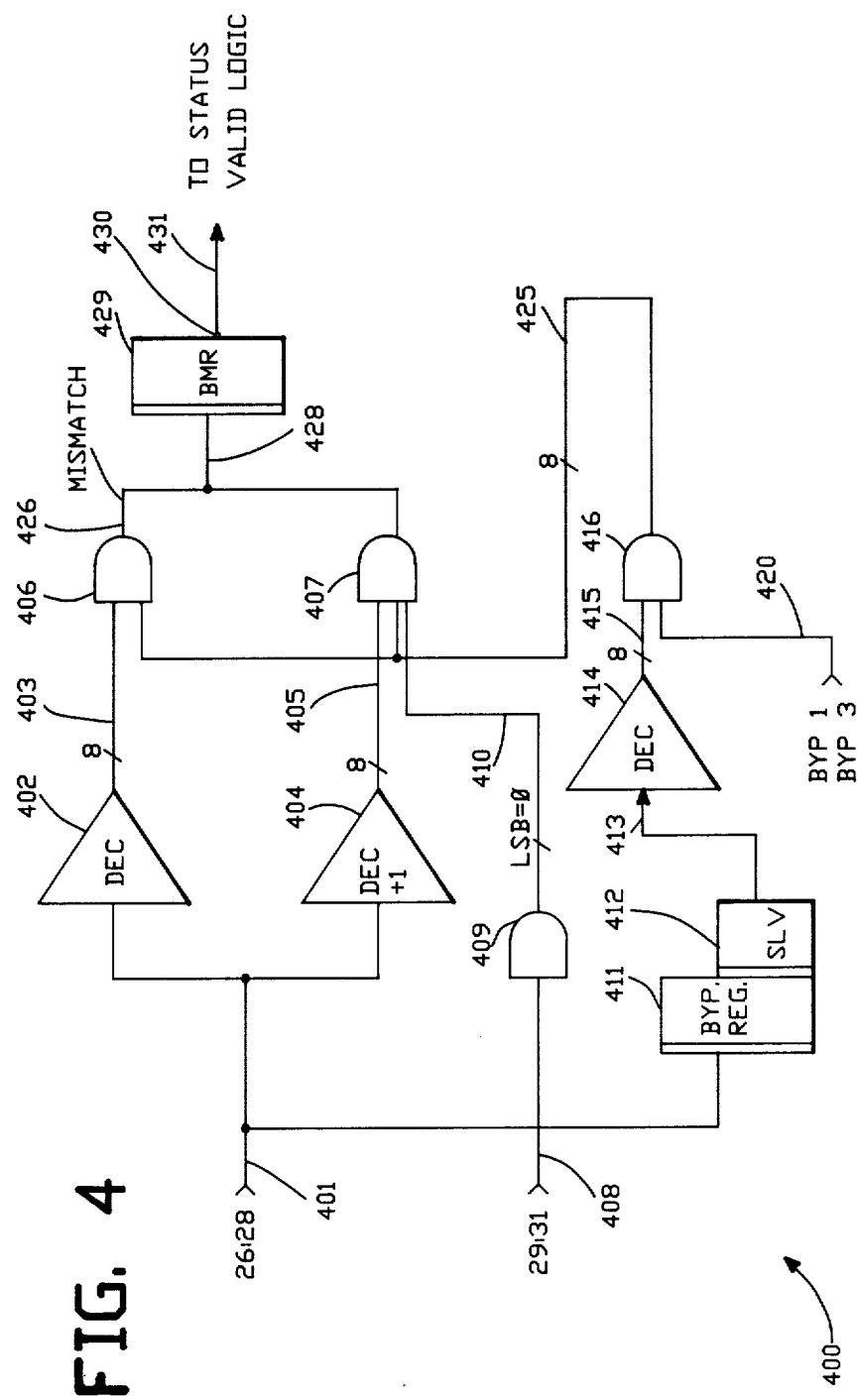
FIG. 4 is a diagram of bypass matching circuitry used as shown in FIG. 3.

With reference to the figures, a detailed description of a preferred embodiment of the present invention is described. First, with reference to FIG. 1, an overview is provided. FIGS. 2 and 3 illustrate the detailed implementation of the data and address paths in the preferred embodiment. Finally, FIG. 4 provides an implementation of matching circuitry utilized in the preferred embodiment.

A. Overview

Figure 1:
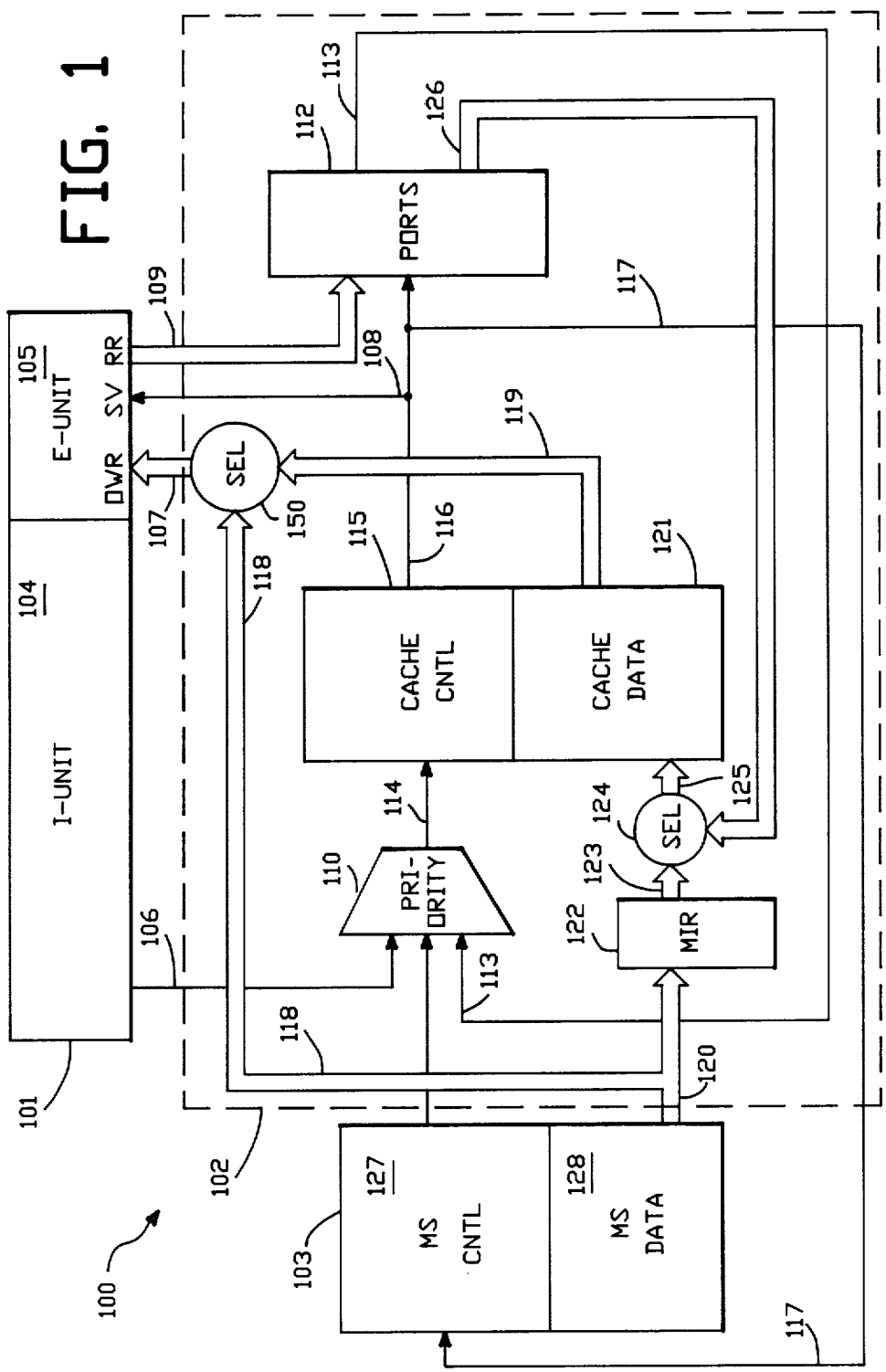
FIG. 1. is a block diagram of a data processing system employing the present invention.

FIG. 1 is a block diagram of a data processing system 100 implementing the present invention. The data processing system 100 includes an instruction and operand processing unit 101, an intermediate storage unit 102, and a main storage unit 103.

The instruction and operand processing unit 101 includes an instruction unit 104 and an execution unit 105. The instruction unit 104 in the preferred embodiment is a pipelined processor generating requests for operands on line 106 for supply to the intermediate storage unit 102 during a cycle of the pipeline. In a following cycle of the pipeline, the instruction unit 104 provides codes to the execution unit 105 to specify a function to be performed. The execution unit 105 includes an operand word register OWR connected across the data bus 107 to the intermediate storage unit 102. In response to a status valid signal on line 108 also supplied by the intermediate storage unit 102 the execution unit 105 receives the data on bus 107 in the OWR. At the end of the operation specified by the codes received from the instruction unit 104, the execution unit 105 supplies results to a result register RR and from there across bus 109 to the intermediate storage unit 102.

The intermediate storage unit 102 in the preferred embodiment is a pipelined or queued processor that receives requests across line 106 from the instruction unit 104 in a priority selection logic 110. The priority selection logic 110 also receives requests from the main storage unit 103 across line 111 and from ports 112 in the intermediate storage unit 102 across line 113. The output of the priority logic 110 is supplied across line 114 to cache control circuitry 115. The cache control circuitry 115 supplies address and control information across line 116 to the ports 112 and to line 108 for supply to the instruction and operand processing unit 101. Further, address and control information is supplied across line 117 to the main storage unit 103. Address and control information is supplied from the ports 112 across line 113 for supply to the priority logic 110.

Data is transferred in response to the address and control information to the execution unit operand word register OWR across bus 107 as mentioned before. Bus 107 is supplied across bus 118 or bus 119 through selector 150. Bus 119 receives data from the cache data locations identified by addresses supplied on line 114. Bus 118 receives data supplied on bus 120 from the main storage unit 103. Thus, the bus 118 illustrates schematically the bypass data path of the present invention.

Data supplied from the main storage unit 103 on bus 120 for move-in of data to the cache data locations 121 is supplied to a move-in register complex 122. Data is held in the move-in register complex 122 pending storage to the cache data locations 121 across bus 123 through selector 124 and across bus 125. The move-in register complex 122 in the preferred embodiment includes error detection and correction logic as described in more detail in FIGS. 2 and 3.

Resulting operands from the result register RR in the execution unit 105 are supplied on bus 109 to the ports 112 as mentioned above. The implementation of ports receiving the resulting data across bus 109, known as "store ports", is described in detail in U.S. Pat. No. 4,722,046 entitled CACHE STORAGE PRIORITY, and U.S. patent application entitled CACHE STORAGE QUEUE, Ser. No. 900,640 filed Aug. 27, 1986 and abandoned in favor of U.S. Ser. No. 233,953. A more detailed description of the implementation of the operand word registers and result registers in the execution unit of the preferred embodiment is provided in U.S. patent application entitled EXECUTION SUB-UNIT SYNCHRONIZATION, Ser. No. 908,623, filed Sept. 18, 1986. The store ports generate requests across line 113 to the priority logic 110 for access to the cache. When a store port request receives priority, data is supplied across bus 126 to selector 124 and through bus 125 to the cache data locations 121.

The main storage unit 103 includes main store control 127 and main store data locations 128. Address and control information are supplied across line 117 from the intermediate storage unit 102 to the main storage control 127. In response to requests to move in a missing line of data, the missing line is supplied from main store data locations 128 to bus 120 as mentioned above.

It can be seen with reference to FIG. 1, a schematic overview of the system incorporating the present invention. More detailed descriptions of the data paths and address and control paths involved in the preferred embodiment are described below with reference to FIGS. 2, 3 and 4.

B. Data Paths

FIG. 2 illustrates the data paths 200 in the preferred embodiment of the bypass apparatus of the present invention. As mentioned above with reference to FIG. 1, the execution unit, E-unit, generates resulting data on line 201 and supplies it to a result register 202. The preferred embodiment, the result register is an 8 byte register which is connected across line 203 to rotation logic 204. The rotation logic 204 aligns the data in a form for storage in the cache as is well known in the art. The output of the rotation logic 204 is supplied across line 205 to the store port registers 0 through 3, 206. As mentioned above, the store ports 206 are described in the applications incorporated by reference. Each of the four store port registers is capable of holding four 8-byte increments of data for a total of 32 bytes. Thus, there are four 32-byte output lines 207 for supplying data out of the store port registers 206. Data from lines 207 is supplied through selector 208 to line 209 for storage in the cache data locations 210. Selector 208 is controlled to select the appropriate source of data in response to the decode of an instruction in the pipeline in the intermediate storage unit. This path corresponds to busses 109 and 126 shown in FIG. 1.

The move-in data path receives data from the main storage unit across lines 211 and 212. In the preferred embodiment, the main storage unit moves an even double word (8 bytes) into an even supply data register 213 for supplying data to the move-in register and an odd double word (8 bytes) into odd supply data register 214 for supplying data to the move-in register (two double words equal one quarterline). The output of the even supply data register 213 is supplied across line 215 to error checking and correcting logic 216. The output of the error checking and correcting logic 216 is supplied across line 217 to even move-in registers, "MI0" 218 and "MI2" 219.

The output of the odd supply data register 214 is supplied across line 220 to error checking and correcting logic 221. The output of the error checking and correcting logic 221 is supplied on line 222 to the odd move-in registers "MI1" 223 and "MI3" 224. The 4 double words in the move-in registers 218, 219, 223, 224 are combined for supply as a 32-byte half line of data across line 225 to the selector 208 and from there across line 209 for storage in the cache data locations 210.

The supply data registers 213, 214 in this embodiment are latch points physically located in or near the intermediate storage unit for timing synchronization purposes. Functionally, they are part of a means for supplying data retrieved from the main storage unit to the intermediate storage unit which may or may not require synchronizing latch points in a particular embodiment.

In response to normal requests for operands, data is supplied from the cache data locations across an even double word output line 226 and an odd double word output line 227. The even and odd words are supplied through selectors 228 and 229 respectively. The output of the selector 228 is supplied on line 230 to rotation logic 231 and the output of the selector 229 is supplied on line 232 to rotation logic 231. The rotation logic 231 rotates the two double words for alignment as indicated in the request for an operand. The even double word after alignment is supplied on line 233 to selector 234. The odd double word after appropriate alignment is supplied on line 235 to selector 234. The output of the selector 234, determined by a requesting address, is supplied on line 236 to the operand word register 237 in the execution unit. This path corresponds to bus 120, bus 123, bus 125 and bus 119 as shown in FIG. 1.

The bypass path shown as bus 118 in FIG. 1 is designated generally by reference numeral 238 in FIG. 2. The bypass path 238 receives an even double word from the even supply data register 213 across bus 215. Likewise it receives an odd double word from the odd supply data register 214 across bus 220. Busses 215 and 220 are supplied to selector 239. The output of the selector 239 is an 8-byte double word on line 240, determined by the requesting address. Line 240 is connected to selectors 228 and 229 which are controlled by a control signal synchronized with the returning of data from the main store into the move-in register 218 in the bypass operation. Thus, the data word supplied on lines 230 and 232 consists either of data supplied from the cache data locations or data supplied across the bypass path 238.

As mentioned above, the intermediate storage unit generates a status valid signal on line 108 in FIG. 1 indicating to the execution unit that data in the operand word register is valid, thus providing a control mechanism for receiving data from the bypass path.

When an error is detected by error checking and correcting logic 216 and 221, a move-in error signal is generated on line 241 that is used in the generation of the status valid signal in bypass situations. The address and control paths accomplishing this mechanism are shown in FIG. 3.

C. Control and Address Paths

FIG. 3 illustrates the control and address paths 300 pertinent to the bypass mechanism of the present invention as implemented in the preferred embodiment.

The control and address paths 300 shown in FIG. 3 reside primarily in the intermediate storage unit. As mentioned above, the intermediate storage unit is a pipelined processor. The states of the pipeline include 4 stages, P, A, B and R. The intermediate storage unit pipeline synchronizes with the pipeline in the instruction unit so that a request for an operand generated by the instruction unit will be satisfied with the data supplied to the operand word register in the execution unit during the appropriate instruction unit cycle. If data is not supplied, the instruction unit may interlock while waiting for the requested data.

As described in FIG. 1, main storage unit MSU generates requests for access to the cache in the intermediate storage unit across line 301 in FIG. 3. The requests are supplied to a priority logic 302. The other inputs to the priority logic include requests from ports in the intermediate storage unit across line 303. The output of the priority logic 302 is supplied across line 304 to an A-cycle operand address register 305. The output of the A-cycle operand address register is supplied on line 306 to a second priority logic 307. Other input to the second priority logic 307 includes requests from the instruction unit across line 308. The output of the second priority logic 307 is supplied on line 309 to a B-cycle operand address register 310.

In addition, the request on line 309 is supplied to a bypass register 311 and to bypass match logic 312. As indicated in FIG. 3, bits 26 through 31 of a 32-bit address are supplied to the bypass match logic 312. Bits 26 to 28 are supplied to the bypass register 311. Data in the bypass register 311 is clocked into a slave register 313. The output of the slave register 313 is supplied across line 314 as a second input to the bypass match logic 312. The bypass match logic 312 also receives an enable signal as described in more detail below across line 315. The output of the bypass match logic 312 is supplied on line 316 to a bypass match register 317 which is latched in the B-cycle of the pipeline.

The output of the B-cycle operand address register is supplied on line 318 to the R-cycle operand address register 319. During the B-cycle, in addition, bits 18 to 25 of the address are supplied to the cache tag 320 which stores data identifying the lines of data stored in cache data locations 321. The bits 18 to 25 are address bits for accessing the cache tag 320. The cache tag 320 is used for matching data stored in cache data locations with system addresses as is known in the art. In response to an access of the cache tag 320, bits 3 through 19 of a main store or system address are supplied on line 322. In addition, the address on line 318 is supplied at inputs to the cache tag 320 for use in updating information in the cache tag 320. Also, the address on line 318 is used for accessing data locations in the cache 321.

Finally, the address on line 318 is supplied as an input to tag match circuitry 323. The other input to the tag match circuitry is bits 3:19 of the system address supplied on line 322. If the addresses match, a true output of the tag match circuitry 323 is asserted on line 338. Also, the address on line 322 is supplied to a cache address out register 326 which is used in transferring address and control information to the main storage unit across line 327.

As an aid in understanding the diagram in FIG. 3, a portion of the data path is shown schematically. In particular, data is supplied to the cache locations on line 328. Cache data is supplied in response to addresses on line 329 to selector 330. The other input to the selector 330 is the bypass path 331. The output of the selector 330 is supplied on line 331 to the operand word register 332 in the execution unit.

The output of the R-cycle operand address register is supplied on line 333 to fetch ports FPO:1, 334. The fetch ports 334 are loaded with address and control information from requests that suffer a cache miss. Requests in the fetch ports 334 are recycled across line 303 for access to the intermediate storage unit pipeline when data is moved in from the main storage unit.

In addition, the store port registers 0 through 3, 335, are loaded with address and control information across line 333 from the R-cycle operand address register. Requests for access to the intermediate storage unit pipeline from the store ports 335 are also cycled across line 303 in the schematic figure.

As mentioned above, the intermediate storage unit generates a status valid signal for supply to the execution unit to indicate that data can be received in the operand word register. The status valid signal is generated at gate 336 in FIG. 3. The inputs to gate 336 include the inverse of the move-in error signal on line 337. In addition, the output of the tag match circuitry 323 is supplied on line 338 as a second input to gate 336 and the output of the bypass match register 317 is supplied on line 339 as the final input to the gate 336. Thus, when the tag match circuitry 323 and bypass match register 317 indicate that a match in both places has occurred and there has been no error in the move-in data, the status valid logic shown schematically as gate 336 in FIG. 3 generates a status valid signal on line 340 to the execution unit allowing the receipt of data in the operand word register 332 for use by an appropriate sub-unit of the execution unit.

As mentioned above, the cache tag 320 includes data identifying system addresses for lines of data stored at cache data locations specified by addresses on line 318. During a move-in to the cache, the cache tag is loaded with bits 3 through 19 of the system address of the data subject of the move-in across line 318 at a location in the cache tag indicated by bits 18 through 25 of the address on line 318. The present invention relies on this fact to use the tag match circuitry 323 in the determination of the availability of data on the bypass path 331 for supply to the operand word register 332. This use of the already existing cache tag circuitry provides a significant savings in logic over previous designs.

In addition to the cache tag circuitry, the bypass match circuitry 312 is employed. A more detailed description of the implementation of the bypass match circuitry 312 is provided in FIG. 4.

D. Bypass Match Circuitry

FIG. 4 shows bypass match circuitry 400 which corresponds to the bypass match block 312 and bypass register 311 in FIG. 3. The bypass match circuitry 400 receives bits 26 to 28 of the requesting address designating the double word in which the requested operand resides across line 401. Line 401 is connected to a first decoder 402 which determines which one of 8 8-byte double words from a 64-byte line of data is subject to the request and generates 8 single bit outputs on line 403, one for each of the 8 possibilities.

In addition, the bits 26 through 28 on line 401 are supplied to a second decoder 404 which increments the possible address of 8-byte section of data by 1 and generates 8 single bit outputs on line 405. The outputs on line 403 and 405 indicate one of 8 possible even and odd pairs of 8-byte double words.

The signals on line 403 are supplied as one input to the AND-gate array 406. Signals on line 405 are supplied as one input to the AND-array 407.

Bits 29 through 31 of the requesting address are supplied on line 408 to gate 409. The output of gate 409 is a signal indicating the least significant bit of the address on line 410. If the least significant bit is not equal to 0, the signal on line 410 is true, indicating that the requesting address identifies an operand residing in two double words (double word crosser). The signal on line 410 is a second input to the AND-array 407.

As shown in FIG. 3, bits 26 to 28 are supplied to the bypass register 411; the bypass slave 412 holds the 3 bits of the address relevant to the bypass match. The output of the slave 412 is supplied on line 413 to a decoder 414 that generates 8 output signals indicating 2 of 8 possible double words indicated by a pending request on line 415. The outputs on line 415 are supplied to the AND-array 416. The second input to the AND-array 416 includes bypass 1 signal or bypass 3 signal on line 420. The bypass 1 signal is a control signal supplied by the main storage unit that synchronized with the move-in of data to the move-in register 218. The bypass 3 signal is generated in response to the decode of requests flowing down the intermediate storage unit pipeline. Together, these signals correspond to the enable signal on line 315 of FIG. 3.

The outputs of AND-array 416 are supplied on line 425. The 8 bits on line 425 are supplied to AND-array 406 and the AND-array 407. The output of the AND-array 406 indicates a mismatch between a requesting address and that stored in the bypass slave register 412 on line 426. Likewise, the output of the AND-array 407 indicates a mismatch on line 427 between the odd word identified by a requesting address and that stored in the bypass slave register 412, when the requested operand is a double word crosser as indicated by the least significant bit equals 0 signal on line 410.

E. Operation

The bypass apparatus according to the present invention is described with reference to Table 1 below which sets forth the timing of the instructions and events involved in the bypass operation. Table 1 illustrates nine cycles of the intermediate storage unit pipeline, labelled cycles 0 through 8, during which five flows of instructions occur relevant to the bypass operation. The five flows include a load bypass flow, LD BYP, a first fetch port recycle flow, FP REC FLOW, a move-in 1 flow, MI 1 FLOW, a second fetch port recycle flow, FP REC FLOW and a move-in 2 flow, MI 2 FLOW.

TABLE 1

```
0   1   2   3   4   5   6   7   8   LD BYP FLOW
                                    SIGNAL FP
P   A   B   R                       LD BYP REG
                                    LD SA IN TAG
                                    BYP 1 EN

1                               FP REC FLOW
                                    BYP MATCH
    P   A   B   R                   SEL SDR TO OWR
                                    SV

3                           MI 1 FLOW
                                    SIGNAL FP
        P   A   B   R               QL0 IN SDR
                                    QL1 IN SDR
                                    QL0-1 IN CACHE
                                    MI ERR QL0
                                    LD BYP REG
                                    BYP 3 EN

4                       FP REC FLOW
                                    BYP MATCH
            P   A   B   R           SEL CACHE TO OWR
                                    SV
```

TABLE 1-continued

```
            5                       MI 2 FLOW
                                    QL2 IN SDR
            P   A   B   R           QL3 IN SDR
                                    QL2-3 IN CACHE 0   1   2   3   4   5   6   7   8
```

The load bypass flow ID BYP begins during cycle 0. Events occurring during the load bypass flow include signaling the fetch port SIGNAL FP that a mover-in is about to occur in the P-cycle of the pipeline, loading the bypass register (designated 311 in FIG. 3) LD BYP REG in the A-cycle of the flow, and loading bits 3-19 of the system address of the line of data to be moved in into the cache LD SA IN TAG during the B-cycle. The bypass 1 enable signal from the main storage unit, BYP 1 EN, is asserted during the R-cycle of the flow. After the load bypass flow, the intermediate storage unit pipeline is armed for a fetch port recycle flow during which a successful bypass could occur.

The first fetch port recycle flow FP REC FLOW must begin in cycle 1, one cycle after the beginning of the load bypass flow, in order for a successful bypass operation for data residing in the first quarterline to be transferred from the main storage unit. During the fetch port recycle flow, the bypass match is conducted during the A-cycle and staged to the B-cycle BYP MATCH, the bypass data path is enabled to select data in the supplying data register (labelled 213 and 214 in FIG. 2) for supply to the operand word register (labelled 237 in FIG. 2) SEL SDR TO OWR, and the status valid signal SV is asserted during the R-cycle, if the bypass match is successful and there is no move-in error in quarterline 0.

In order for the first fetch port recycle to be successful, the move-in 1 flow MI 1 FLOW must begin in cycle 3, 3 cycles after the beginning of the load bypass flow. The move-in 1 flow begins in the P-cycle with signaling the fetch port that a move-in 1 flow is occurring in the SIGNAL FP. Quarterline 0 is supplied to the supply data register in cycle P, QL0 IN SDR, quarterline 1 is supplied to the supplying data register in cycle A, QL1 IN SDR, and at the completion of the move-in 1 flow, cycle R, both quarterlines 0 and 1 are stored in the cache and are available for subsequent bypass access.

Move-in errors in quarterline 1 are detected during the P-cycle of the move-in 1 flow MI ERR QL0. It can be seen that the move-in error detected in the P-cycle of the move-in 1 flow corresponds with the B-cycle of the previous fetch port recycle flow during which the results of the bypass match are available. Thus, both events can be used in the generation of the status valid signal for the R-cycle of the fetch port recycle flow.

If the data required by the request in the fetch port resides in quarterline 1 rather than quarterline 0 or if for some reason the fetch port recycle flow did not occur prior to the move-in 1 flow, the move-in 1 flow is utilized to arm the intermediate storage pipeline for a bypass during a subsequent fetch port recycle flow. Thus, the bypass register is reloaded during the A-cycle of the move-in 1 flow LD BYP REG and the bypass 3 enable signal is generated during the A-cycle decode and staged through the B- and R-cycles of the move-in 1 flow BYP 3 EN. The bypass 3 enable signal is disabled by a decode in the A-cycle of the move-in 2 flow. Thus, if a fetch port recycle flow FP REC FLOW occurs between the move-in 1 flow and the move-in 2 flow, a bypass can occur from the cache to the operand word register for data in quarterline 0 or 1.

Thus in the subsequent fetch port recycle flow shown occurring in cycle 4, a bypass match is conducted during the A-cycle and staged to the B-cycle BYP MATCH. The data is selected from the cache to the OWR from quarterline 0 to 1 during the R-cycle SEL CACHE to OWR, and a status valid signal SV is asserted during the R-cycle. This effectively overrides the cache control to allow access to the cache prior to storage of the entire line in the cache.

The following move-in 2 flow occurs at least two cycles after the beginning of the move-in 1 flow, shown as cycle 5 in the Table. During the P-cycle of the move-in 2 flow, quarterline 2 is loaded into the supply data register QL2 IN SDR, during the A-cycle quarterline 3 is loaded into the supply data register QL3 IN SDR and, finally, quarterlines 2 and 3 are loaded in the cache and available for subsequent access in the R-cycle of the move-in 2 flow. Thus any requests for access to the moved-in line of data that begins one cycle after the move-in 2 flow (or during cycle 6 as shown in Table 1) will be successful in accessing data from the cache and no bypass is necessary. Data accessed by such subsequent flow would be receiving status valid at the earliest during cycle 9, not shown on the Table.

It can be seen from Table 1 that for data located in the first quarterline of a line being moved in to the cache, the bypass apparatus of the present invention provides the requested operand to the operand word register in cycle 4, five cycles earlier than would be available without bypass circuitry. If the first fetch port recycle flow does not occur or if the requested data includes data in quarterline 1, a fetch port recycle occurring after the move-in 1 flow will make data available from quarterlines 0 and 1 that has already been stored in the cache for supply to the operand word register in cycle 7 shown in Table 1 for a two cycle savings over a system without a bypass. It is found, however, that in the vast majority of cases, the operand identified by a request in a fetch port is supplied in quarterline 0 and is made available during the first fetch port recycle flow after the load bypass flow.

CONCLUSION

By providing a bypass path as taught by the present invention, it is found that a significant reduction in the critical cache line miss penalty is achieved over the prior art designs discussed in the background of the invention. Each one-cycle reduction in the cache miss penalty has been found to provide a two per cent overall performance improvement for the data processing machine.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for transferring data among an instruction and operand processing unit, an intermediate storage unit and a main storage unit in a data processing system, the instruction and operand processing unit supplying requests for operands to the intermediate storage unit, the intermediate storage unit supplying, in response to a request, a requested operand to the instruction and operand processing unit or causing a move-in request for the requested operand to be supplied to the main storage unit, and the main storage unit retrieving data including the requested operand in response to the move-in request, the apparatus comprising:

move-in means, coupled to receive data retrieved from the main storage unit, for storing the retrieved data pending storage in the intermediate storage unit;

storage means, in the intermediate storage unit and coupled to the move-in means, for storing data retrieved from the move-in means for supply to the instruction and operand processing unit;

primary means, coupled to the storage means and the instruction and operand processing unit, for transferring requested operands from the storage means to the instruction and operand processing unit in response to requests;

bypass means, connected between the main storage unit and the instruction and operand processing unit, for transferring requested operands from the main storage unit to the instruction and operand processing unit before error checking is done in the intermediate storage unit;

bypass matching means, in the intermediate storage unit, for matching requests for operands with data which is the subject of a move-in request being retrieved by the main storage unit, and generating a bypass match signal when a match occurs; and control means, connected to receive the requests for operands, to the bypass matching means, and to the instruction and operand processing unit, for signaling the instruction and operand processing unit to receive a requested operand from the bypass means in response to the bypass match signal.

2. The apparatus of claim 1, wherein the intermediate storage unit includes addressing means, in communication with the storage means and the instruction and operand processing unit, for addressing the storage means in response to requests for operands;

means, in communication with the addressing means, for determining whether a line including the requested operand is present in or missing from the storage means;

request storage means, in communication with the addressing means and the means for determining, for storing a request for an operand if the requested operand is in a missing line, and supplying a request to the addressing means during retrieval of a line including the requested operand from the main storage unit;

wherein the bypass matching means means includes means, in communication with the addressing means, for matching a system address of a line of data being retrieved from the main storage unit, with a request in the addressing means to assert the bypass match signal when a match occurs, the system address identifying a location of the line of data in the main storage unit.

3. The apparatus of claim 1, wherein the intermediate storage unit includes addressing means, in communication with the storage means and the instruction and operand processing unit, for addressing the storage means in response to requests for operands;

tag storage means, in communication with the addressing means, for storing tags identifying lines of data in the storage means, the tags including a first subset of a system address, the system address identifying a location of the line of data in the main storage unit, and the first subset being supplied to the tag storage means before data is stored in the storage means;

tag matching means, in communication with the tag storage means and the addressing means, for matching the first subset of the system address in the tag storage means with requests in the addressing means to assert a line present signal when a tag identifying a requested line of data is present in the tag storage means, or a line missing signal when a tag identifying a requested line of data is missing from the tag storage means;

request storage means, in communication with the addressing means and the tag matching means, for storing a request for an operand in response stored in the missing signal, and supplying a request stored in the request storage means to the addressing means during retrieval from the main storage unit of a line of data to satisfy the request;

wherein the bypass matching means includes means, in communication with the addressing means, for matching a second subset of the system address of a line of data being retrieved from the main storage unit with a request in the addressing means to assert the bypass match signal when a match occurs; and wherein the control means includes means, in communication with the tag matches means and the bypass matching means, for enabling the instruction and operand processing unit to receive a requested operand from the bypass means in response to a line present signal and a bypass match signal.

4. The apparatus of claim 1, further including error detecting means, connected between the main storage unit and the move-in means, for detecting errors in a line of data being moved into the move-in means and asserting a move-in error signal; and wherein the control means further includes means, responsive to a move-in error signal for disabling the instruction and operand processing unit from receiving a requested operand from the bypass means.

5. The apparatus of claim 2, further including error detecting means, connected between the main storage unit and the move-in means, for detecting errors in a line of data being moved into the move-in means and asserting a move-in error signal; and wherein the control means further includes means, responsive to a move-in error signal, for disabling the instruction and operand processing unit from receiving a requested operand from the bypass means.

6. The apparatus of claim 3, further including error detecting means, connected between the main storage unit and the move-in means, for detecting errors in a line of data being moved into the move-in means and asserting a move-in error signal; and wherein the control means further includes means, responsive to a move-in error signal, for disabling the instruction and operand processing unit from receiving a requested operand from the bypass means.

7. An apparatus for transferring data among an instruction and operand processing unit, an intermediate storage unit and a main storage unit in a data processing system, the instruction and operand processing unit supplying requests for operands to the intermediate storage unit, the intermediate storage unit supplying, in response to a request, a requested operand to the instruction and operand processing unit or causing a move-in request for the requested operand to be supplied to the main storage unit, and the main storage unit retrieving data including the requested operand in response to the move-in request, the apparatus comprising:

supply means, in communication with the main storage unit, for supplying retrieved data from the main storage unit to the intermediate storage unit;

error detecting means, coupled to the supply means, for detecting move-in errors in the retrieved data;

move-in register means, coupled to the error detecting means, for receiving the retrieved data to be stored in the intermediate storage unit;

storage means, in the intermediate storage unit and coupled to the move-in register means, for storing the retrieved data from the main storage unit for supply to the instruction and operand processing unit;

primary means, coupled to the storage means and the instruction and operand processing unit, for transferring requested operands to the instruction and operand processing unit in response to requests;

bypass means, connected between the supply means and the instruction and operand processing unit, for transferring requests operands to the instruction and operand processing unit before error checking is done in the intermediate storage unit;

bypass matching means, in the intermediate storage unit, for matching requests for operands with data which is the subject of a move-in request being retrieved by the main storage unit, and generating a bypass match signal when a match occurs; and control means, coupled to receive the requests for operands and to the instruction and operand processing unit, for signaling the instruction and operand processing unit to receive a requested operand from the bypass means in response to the bypass match signal.

8. The apparatus of claim 7, wherein the intermediate storage unit includes addressing means, in communication with the storage means and the instruction and operand processing unit, for addressing the storage means in response to requests for operands;

means, in communication with the addressing means, for determining whether a line including a requested operand is present in or missing from the storage means;

request storage means, in communication with the addressing means and the means for determining, for storing a request for an operand if the requested operand is in a missing line, and supplying a request stored in the request means to the addressing means during retrieval of a line including the requested operand from the main storage unit;

wherein the bypass matching means includes means, in communication with the addressing means, for matching a system address of a line of data being retrieved from the main storage unit with a request in the addressing means to assert a bypass match signal when a match occurs, the system address identifying a location of the line of data in the main storage unit; and wherein the control means includes means, in communication with the bypass matching means, for enabling the instruction and operand processing unit to process a requested operand from the bypass means in response to a bypass match signal when there is no move-in error.

9. The apparatus of claim 7, wherein the intermediate storage unit includes addressing means, in communication with the storage means and the instruction and operand processing unit, for addressing the storage means in response to requests for operands;

tag storage means, in communication with the addressing means, for storing tags identifying lines of data in the storage means, the tags including a first subset of a system address, the system address identifying a location of the line of data in the main storage unit, and the first subset being supplied to the tag storage means before data is stored in the storage means;

tag matching means, in communication with the tag storage means and the addressing means, for matching the first subset of the system address in the tag storage means with requests in the addressing means to assert a line present signal when a tag identifying a requested line of data is present in the tag storage means, or a line missing signal when a tag identifying a requested line of data is missing from the tag storage means;

request storage means, in communication with the addressing means and the tag matching means, for storing a request for an operand in response to a line missing signal, and supplying a request stored in the request storage means to the addressing means during retrieval of data to satisfy the request from the main storage unit;

wherein the bypass matching means includes means, in communication with the addressing means, for matching a second subset of the system address of a line of data being retrieved from the main storage unit with a request in the addressing means to assert the bypass match signal when a match occurs; and wherein the control means includes means, in communication with the tag matching means, the bypass matching means and the error detecting means, for enabling the instruction and operand processing unit to process a requested operand from the bypass means in response to a line present signal and a bypass match signal when there is no move-in error.

* * * * *